(12) United States Patent
Tomizawa et al.

(10) Patent No.: US 8,724,499 B2
(45) Date of Patent: May 13, 2014

(54) COMMUNICATION SYSTEM

(75) Inventors: Takeshi Tomizawa, Yokohama (JP); Tomoya Tandai, Kawasaki (JP); Ryoko Matsuo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 105 days.

(21) Appl. No.: 13/411,197

(22) Filed: Mar. 2, 2012

(65) Prior Publication Data
US 2012/0163226 A1 Jun. 28, 2012

Related U.S. Application Data

(63) Continuation of application No. PCT/JP2009/004372, filed on Sep. 4, 2009.

(51) Int. Cl.
*H04L 1/00* (2006.01)

(52) U.S. Cl.
USPC .......................... 370/252; 370/329

(58) Field of Classification Search
USPC ........................................... 370/252
See application file for complete search history.

(56) References Cited

U.S. PATENT DOCUMENTS

| | | | |
|---|---|---|---|
| 2002/0080739 | A1 | 6/2002 | Kuwahara |
| 2007/0115847 | A1 | 5/2007 | Strutt et al. |
| 2007/0291792 | A1* | 12/2007 | Watfa et al. .................... 370/469 |
| 2008/0095089 | A1 | 4/2008 | Nishiyama et al. |
| 2009/0180414 | A1* | 7/2009 | Maeda et al. ................. 370/311 |
| 2009/0190608 | A1 | 7/2009 | Kawamoto |
| 2010/0027493 | A1* | 2/2010 | Dinulescu et al. ............ 370/329 |
| 2010/0029325 | A1 | 2/2010 | Wang et al. |
| 2010/0142465 | A1 | 6/2010 | Medepalli et al. |
| 2010/0189056 | A1 | 7/2010 | Nishibayashi et al. |
| 2011/0044169 | A1 | 2/2011 | Liu |
| 2011/0200138 | A1 | 8/2011 | Ode et al. |
| 2011/0205080 | A1* | 8/2011 | Millot et al. ............... 340/854.4 |
| 2013/0051318 | A1 | 2/2013 | Matsuo et al. |

FOREIGN PATENT DOCUMENTS

| | | |
|---|---|---|
| JP | 08-070292 A | 3/1996 |
| JP | 2006-094394 A | 4/2006 |
| JP | 2006-333358 A | 12/2006 |
| JP | 2008-079045 A | 4/2008 |
| JP | 2008-306665 A | 12/2008 |
| JP | 2009-182444 A | 8/2009 |

OTHER PUBLICATIONS

Japanese Office Action dated May 15, 2013 (and English translation thereof) in counterpart Japanese Application No. 2011-529698.
U.S. Appl. No. 13/409,642, First Named Inventor: Ryoko Matsuo, Filed: Mar. 1, 2012, Title: "Wireless Communication Apparatus and Interference Avoidance Method".

* cited by examiner

*Primary Examiner* — Huy D Vu
*Assistant Examiner* — Kevin Cunningham
(74) *Attorney, Agent, or Firm* — Holtz, Holtz, Goodman & Chick, PC

(57) ABSTRACT

According to one embodiment, a communication device includes a first wireless device configured to transmit a signal and a second wireless device configured to transmit a positive acknowledge when reception of the signal is successful. In the first wireless device, a first controller controls a first transmission module to change a first frequency channel based on a change order stored in a first storage when the positive acknowledge is not received even after the time measured by a first timer exceeds a first period. In the second wireless device, a second controller controls a second reception module to change the first frequency channel based on the change order stored in a second storage when the positive acknowledge is not transmitted even after the time measured by a second timer exceeds the first period.

3 Claims, 4 Drawing Sheets

COMMUNICATION SYSTEM

This is a Continuation Application of PCT Application No. PCT/JP2009/004372, filed on Sep. 4, 2009, which was published under PCT Article 21(2) in Japanese, the entire contents of which are incorporated herein by reference.

FIELD

Embodiments described herein relate generally to a communication system.

BACKGROUND

There is a method for performing, upon detection of deterioration in a communication status, communication by carrying out channel switching and using a different frequency. In this method, a transmitter transmits, to a receiver, a frame for providing a channel switching instruction, thereby realizing channel switching.

In the foregoing method, exchange of an instruction frame for providing a channel switching instruction is performed after detection of deterioration in a communication environment; therefore, when the environment is abruptly deteriorated, the exchange of the instruction frame might end in failure. When the exchange has ended in failure, channel switching cannot be carried out, and communication cannot be continued.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

DETAILED DESCRIPTION

Figure 1:
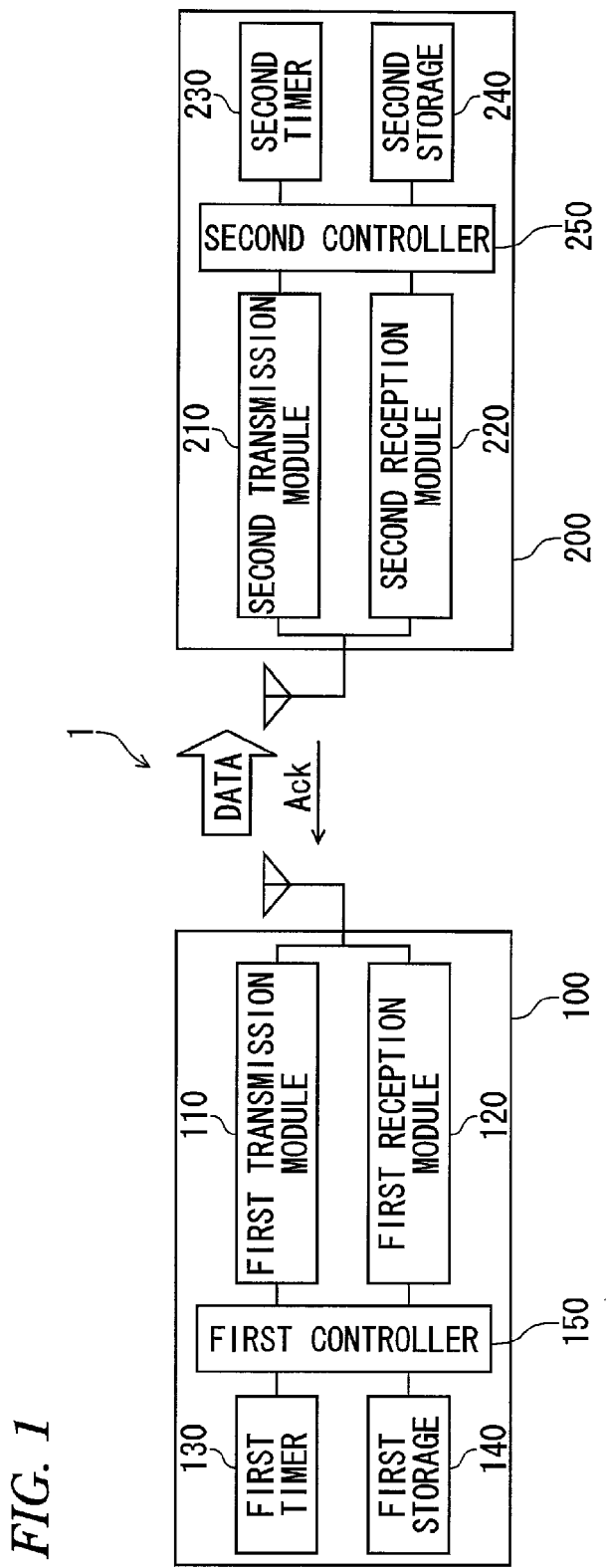
FIG. 1 is an exemplary view illustrating a communication system 1 according to a first embodiment.

In general, according to one embodiment, a communication device includes a first wireless device and a second wireless device. The first wireless device is configured to transmit a signal. The second wireless device is configured to transmit a positive acknowledge when reception of the signal is successful. The first wireless device comprises a first transmission module, a first reception module, a first timer, a first storage, and a first controller. The first transmission module is configured to transmit the signal by using a first frequency channel. The first reception module is configured to receive the positive acknowledge. The first timer is configured to measure a time elapsed from the reception of the positive acknowledge by the first reception module. The first storage is configured to store the order of change of a plurality of the first frequency channels to be used for transmission by the first transmission module. The first controller is configured to control the first transmission module to change the first frequency channel based on the change order when the positive acknowledge is not received even after the time measured by the first timer exceeds a first period. The second wireless device comprises a second transmission module, a second reception module, a second timer, a second storage, and a second controller. The second reception module is configured to receive the signal by using the first frequency channel. The second transmission module is configured to transmit the positive acknowledge when the reception of the signal is successful. The second timer is configured to measure a time elapsed from the transmission of the positive acknowledge by the second transmission module. The second storage is configured to store the order of change of a plurality of the first frequency channels to be used for reception by the second reception module, the order being the same as the change order stored in the first storage. The second controller is configured to control the second reception module to change the first frequency channel based on the change order when the positive acknowledge is not transmitted even after the time measured by the second timer exceeds the first period.

Hereinafter, exemplary embodiments will be described with reference to the drawings. Note that in the following embodiments, elements identified by the same reference numerals operate in a similar manner, and redundant description thereof will be omitted.

First, the terms used in the following embodiments will be described. In a communication system according each embodiment, a plurality of wireless devices exchange packets, thereby performing communication. Examples of packets include a data packet and an Ack packet.

"SN (Sequence Number)" refers to a number set for each packet by the communication system, and the numbers are provided in ascending or descending order. Alternatively, the numbers are provided in an order so that the next number can be predictable for both of transmission and reception. The SN is inserted into a certain position of a packet to be transmitted or a position at which the SN is recognizable, and a receiver can extract the SN from a received packet.

"UID (Unit Identifier)" refers to an individual ID assigned to each wireless device, and a transmission source UID and a destination UID are included in a packet.

(First Embodiment)

The communication system according to a first embodiment will be described. The communication system 1 according to the present embodiment includes a first wireless device 100 and a second wireless device 200.

FIG. 1 illustrates the first wireless device 100 and the second wireless device 200. The first wireless device 100 includes: a first transmission module 110 for transmitting a signal; a first reception module 120 for receiving, when the second wireless device 200 serving as a communication partner has succeeded in receiving the signal, a positive acknowledge transmitted by the second wireless device 200; a first timer 130 for measuring a time elapsed from the reception of the positive acknowledge by the first reception module 120; a first storage 140 for storing the order of change of frequency channels to be used when a signal is transmitted by the first transmission module 110; and a first controller 150 for controlling, when no positive acknowledge is received even after a time measured by the first timer exceeds a first period, the first transmission module 110 so as to change the frequency channel based on the order of change.

The first transmission module 110 performs error correction coding, modulation, and frequency conversion up-conversion on a transmission packet, which is given from the first controller 150, to generate and transmit a wireless signal. The transmission packet includes the above-mentioned data such as SN, UID of the first wireless device 100 serving as a transmission source, and UID of the second wireless device 200 serving as a destination.

The first reception module 120 receives a wireless signal transmitted from the second wireless device 200. The first reception module 120 performs frequency conversion down-conversion, demodulation, and error correction decoding on the wireless signal to generate a reception packet, and gives the reception packet to the first controller 150.

Based on an instruction provided from the first controller 150, the first timer 130 measures a time elapsed from the reception of an Ack packet. When the measured time exceeds the first period, the first timer 130 notifies the first controller 150 of occurrence of a timeout. The first timer 130 resets the measurement time in accordance with an instruction provided from the first controller 150, and starts new elapsed time measurement.

The first storage 140 includes a storage medium such as a memory. The first storage 140 stores a plurality of frequency channels, to be used by the first transmission module 110 for packet transmission, in advance. The first storage 140 stores the order of change of the plurality of frequency channels (see FIG. 2B, for example). Further, the first storage 140 also stores the frequency channel being used by the first transmission module 110. Note that in the present embodiment, the first reception module 120 also uses the frequency channel, which is the same as that used by the first transmission module 110, in receiving the wireless signal.

The first controller 150 receives, from an unillustrated application or higher-layer protocol (which will be collectively referred to as a "higher layer"), data to be transmitted, converts the data into a single data packet or performs the conversion after division, and adds necessary header information to the data packet, thereby generating a transmission packet. The first controller 150 gives the transmission packet to the first transmission module 110.

Upon reception of the reception packet from the first reception module 120, the first controller 150 extracts SN, transmission source UID and destination UID included in header information of the reception packet. When the reception packet is an Ack packet associated with the transmission packet transmitted by the first transmission module 110, the first controller 150 provides an instruction to the first timer 130 so as to reset the time that has been measured so far by the first timer 130 and start new time measurement.

When the time measured by the first timer 130 exceeds the first period, the first controller 150 reads, from the first storage 140, the next frequency channel to be used, and controls the first transmission module 110 and the first reception module 120 so that packet transmission and reception are carried out by using the read frequency channel.

The second wireless device 200 includes: a second reception module 220 for receiving the signal transmitted from the first wireless device 100; a second transmission module 210 for transmitting the positive acknowledge when the reception of the signal is successful; a second timer 230 for measuring a time elapsed from the transmission of the positive acknowledge by the second transmission module 210; a second storage 240 for storing the order of change of frequency channels used for the reception of the signal by the second reception module 220; and a second controller 250 for controlling, when no positive acknowledge is transmitted even after the time measured by the second timer 230 exceeds the first period, the second reception module 220 so as to change the frequency channel based on the order of change.

The second reception module 220 receives the wireless signal transmitted from the first wireless device 100. The second reception module 220 performs frequency conversion down-conversion, demodulation, and error correction decoding on the wireless signal through a wireless communication module to generate a reception packet, and gives the reception packet to the second controller 250.

Upon reception of a transmission packet from the second controller 250, the second transmission module 210 performs error correction coding, modulation, and frequency conversion up-conversion on the transmission packet to generate and transmit a wireless signal.

Based on an instruction provided from the second controller 250, the second timer 230 measures a time elapsed from the transmission of an Ack packet. When the measured time exceeds the first period, the second timer 230 notifies the second controller 250 of occurrence of a timeout. The second timer 230 resets the measured time in accordance with an instruction provided from the second controller 250, and starts new elapsed time measurement.

The second storage 240 includes a storage medium such as a memory. The second storage 240 stores a plurality of frequency channels, to be used by the second reception module 220 for packet reception, in advance. The second storage 240 stores the order of change of the plurality of frequency channels (see FIG. 2B, for example). The change order is the same as that stored in the first storage 140. Further, the second storage 240 also stores the frequency channel being used by the second reception module 220. Note that in the present embodiment, the second transmission module 210 also uses the frequency channel, which is the same as that used by the second reception module 220, in transmitting the packet.

The second controller 250 determines whether a data sequence of the reception packet given from the second reception module 220 is normal. When the data sequence of the reception packet is normal, the second controller 250 determines that the reception of the wireless signal is successful. Upon determination that the reception is successful, the second controller 250 extracts the header information added to the reception packet, and extracts the SN of the data packet and the UID of the transmission source from the header information. Then, the second controller 250 creates an Ack packet in which the SN of the reception packet is included in header information, and gives, as a transmission packet, the Ack packet to the second transmission module 210.

When the second controller 250 is notified of the transmission of the Ack packet from the second transmission module 210, the second controller 250 provides an instruction to the second timer 230 so as to reset the time that has been measured so far by the second timer 230 and start new time measurement. When the time measured by the second timer 230 exceeds the first period, the second controller 250 reads, from the second storage 240, the next frequency channel to be changed, and controls the second transmission module 210 and the second reception module 220 so that packet transmission and reception are carried out by using the read frequency channel.

Figure 2:
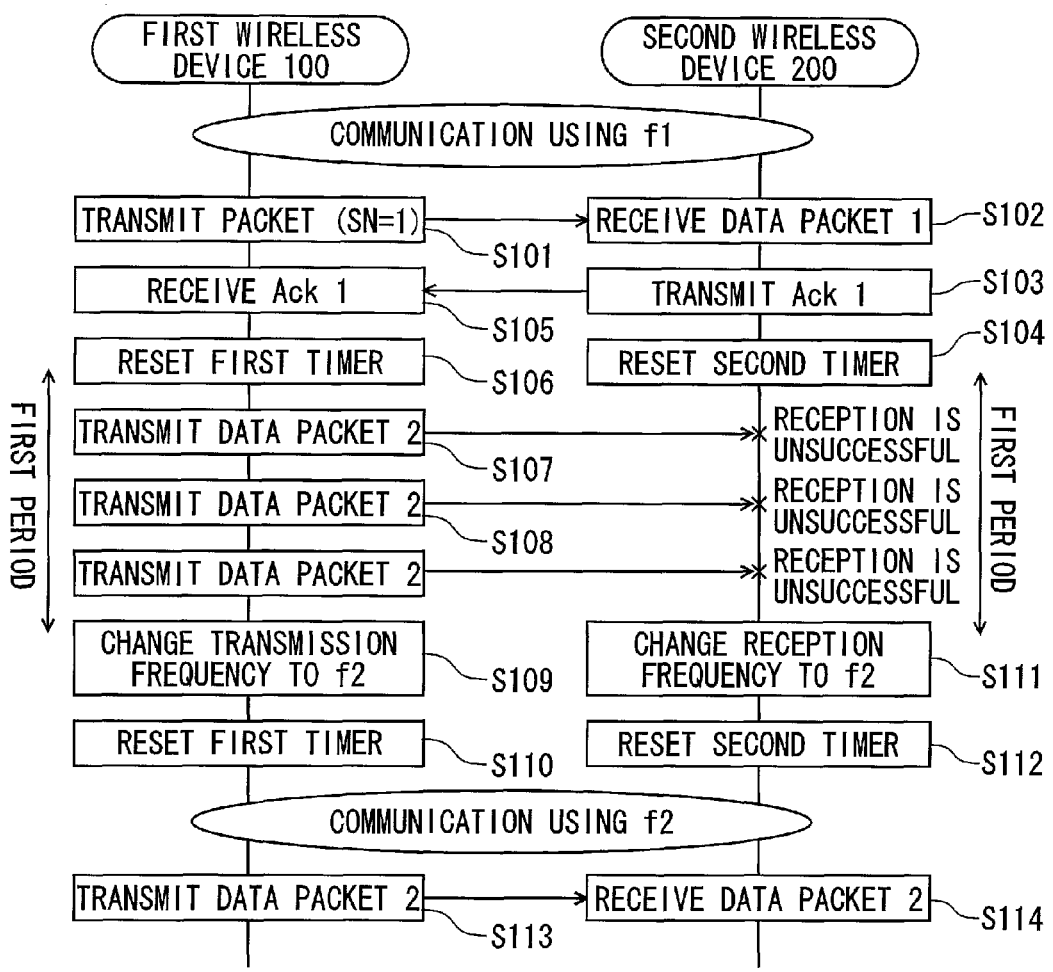
FIG. 2 is an exemplary flow of sequences of the communication system 1 according to the first embodiment.

Next, operations of the communication system according to the present embodiment will be described with reference to FIGS. 2A and 2B. FIG. 2A illustrates sequences performed by the communication system. FIG. 2B illustrates a table stored in each of the first and second storages 140 and 240. In this embodiment, the first and second storages 140 and 240 each store a table such as one illustrated in FIG. 2B, in which the order of change of the frequency channels and the frequency channel being used are provided. Specifically, the first and second wireless devices 100 and 200 perform communication by using a first frequency channel f1, and then the frequency channel is changed in the following order: a second frequency channel f2, a third frequency channel f3, and a fourth frequency channel f4. Then, after the fourth frequency channel f4, the frequency channel is returned to the first frequency channel f1.

First, the first and second wireless devices 100 and 200 perform communication by using the first frequency channel f1. Referring to FIG. 2A, the first wireless device 100 transmits a packet 1 in which SN=1 (S101). Specifically, the first transmission module 110 performs signal processing on the packet 1, generated by the first controller 150, to transmit the packet 1.

The second wireless device 200 receives the packet 1 (S102). Specifically, the second reception module 220 performs signal processing on the received wireless signal to generate the packet 1, and gives the packet 1 to the second controller 250.

The second controller 250 determines whether or not the reception of the packet 1 is successful. When the reception of the packet 1 is successful, the second controller 250 generates an Ack packet 1. The Ack packet 1 is transmitted from the second transmission module 210 (S103).

When the second controller 250 is notified of the end of the transmission of the Ack packet 1 from the second transmission module 210, the second controller 250 provides an instruction to the second timer 230 so as to reset the measured time and start new time measurement (S104).

The first wireless device 100 receives the Ack packet 1 (S105). Specifically, the first reception module 120 performs signal processing on the received wireless signal to generate an Ack packet, and gives the Ack packet to the first controller 150.

The first controller 150 determines whether or not the Ack packet 1 is a positive acknowledge associated with the packet 1. When the Ack packet 1 is an Ack packet associated with the packet 1, the first controller 150 provides an instruction to the first timer 130 so as to reset the measured time and start new time measurement (S106).

When there is a packet to be subsequently transmitted, the first wireless device 100 transmits the subsequent packet. Referring to FIG. 2A, the first wireless device 100 transmits a packet 2 in which SN=2 (S107).

The following description will be made on a case where the reception of the packet 2 by the second wireless device 200 is unsuccessful due to communication environment deterioration. For example, when another wireless communication system starts to use the first frequency channel f1 and thus causes interference, or when the first wireless device 100 or the second wireless device 200 is moved and a transmission environment is thus changed to cause an error in the reception packet, the reception of the packet 2 by the second wireless device 200 might be unsuccessful. When the packet reception is unsuccessful, the second wireless device 200 transmits no Ack packet.

After the transmission of the packet 2, the first wireless device 100 is put on standby to receive the Ack packet; however, when no Ack packet is received even after the first wireless device 100 has been put on standby for a certain period of time, the first wireless device 100 determines that no Ack packet has been transmitted, and starts retransmission of the packet 2 (S108). The certain period of time is shorter than the first period that is continued until the timeout of the first timer 130. A packet retransmission process is managed by the first controller 150. The first controller 150 makes preparations for the retransmission at a point in time when no Ack packet is received after a time at which the Ack packet should be received subsequent to the transmission of the packet 2. In performing the retransmission, the first controller 150 transmits the packet 2, which is the same as the previous one, from the first transmission module 110. After the transmission, the first wireless device 100 is put on standby again until the first wireless device 100 receives the Ack packet from the second wireless device 200.

When the retransmission process is repeated many times by the first wireless device 100, the time elapsed from the previous reception of the Ack packet exceeds the first period, and the timeout of the first timer 130 occurs. When the first controller 150 is notified of the timeout from the first timer 130, the first controller 150 makes reference to the first storage 140 to read the next frequency channel to be used. In the embodiment illustrated in FIG. 2B, the first controller 150 reads the second frequency channel f2. The first controller 150 changes the frequency channel, which is to be used, from f1 to f2 (S109), and rewrites the frequency channel, which is being used and stored in the first storage 140, from f1 to f2. Furthermore, the first controller 150 provides an instruction to the first timer 130 so as to reset the measured time and start new time measurement (S110).

On the other hand, also in the second wireless device 200, upon lapse of the first period from the transmission of the Ack packet 1, the timeout of the second timer 230 occurs. The transmission of the Ack packet 1 by the second wireless device 200 and the reception of the Ack packet 1 by the first wireless device 100 are carried out at substantially the same time, and therefore, the timeout of the first timer 130 of the first wireless device 100 and that of the second timer 230 of the second wireless device 200 substantially simultaneously occur.

When the second controller 250 is notified of the timeout from the second timer 230, the second controller 250 makes reference to the second storage 240 to read the next frequency channel to be used. In the embodiment illustrated in FIG. 2B, the second controller 250 reads the second frequency channel f2. The second controller 250 changes the frequency channel, which is to be used, from f1 to f2 (S111), and rewrites the frequency channel, which is being used and stored in the second storage 240, from f1 to f2. Furthermore, the second controller 250 provides an instruction to the second timer 230 so as to reset the measured time and start new time measurement (S112).

Since the timeout of the first timer 130 and that of the second timer 230 substantially simultaneously occur as mentioned above, the frequencies used by the first and second wireless devices 100 and 200 are substantially simultaneously switched from the first frequency channel f1 to the second frequency channel f2 without exchange of any particular channel switching frame. The first wireless device 100 transmits the packet 2 by using the second frequency channel f2 (S113). Operations to be performed when the reception of the packet 2 by the second wireless device 200 is successful (S114) are similar to those performed when the reception of the packet 1 is successful. On the other hand, when the reception of the packet 2 by the second wireless device 200 is unsuccessful even after the frequency channel has been switched to the second frequency channel f2, operations similar to those of S108 and the subsequent steps will be performed. Specifically, the packet 2 is transmitted more than once by using the second frequency channel f2, but when the reception of the packet 2 is unsuccessful in each case, the timeout of the first timer 130 and that of the second timer 230 occur; hence, the first and second wireless devices 100 and 200 each change the frequency channel from the second frequency channel f2 to the third frequency channel f3.

As described above, in the communication system according to the first embodiment, when packet transmission and reception are unsuccessful even after a lapse of a certain period of time from the reception of the Ack packet by the first wireless device 100 and the transmission of the Ack packet by the second wireless device 200, the frequency channel, which is used for communication, is changed in accordance with the order stored in each of the first and second storages 140 and 240. Thus, the first and second wireless devices 100 and 200 are capable of switching the frequency channels without exchanging a frequency channel switching frame. Even when a communication environment is abruptly deteriorated and frame exchange cannot be carried out, communication can be continued.

Note that the frequency channel change order stored in each of the first and second storages 140 and 240 may be defined in advance as system specifications. Alternatively, before or after the first and second wireless devices 100 and 200 are connected with each other, mutually usable frequencies may be exchanged to decide the frequencies usable by both of the devices and the order of the frequencies to be switched, and then a normal packet or a dedicated control packet may be used to allow both of the devices to have the same frequencies and the same switching order.

Further, the first and second storages 140 and 240 may store only frequency channels. In that case, the frequency channel may be changed in the stored order, for example. Alternatively, the first and second storages 140 and 240 may store only the frequency channel change order, and an additional storage for storing only frequency channels may be provided separately from the first and second storages 140 and 240. In that case, in changing the frequency channel, the first and second controllers 150 and 250 each make reference to this storage and the first and second storages 140 and 240 or perform predefined computations using a reference value, thereby deciding the frequency channel after the change.

Alternatively, the first controller 150 or the second controller 250 may only make a decision on frequency channel change, and may provide notification of a change instruction to the first transmission module 110 or the second reception module 220. In that case, the first transmission module 110 or the second reception module 220 which has received the change instruction reads, from the first storage 140 or the second storage 240, the next frequency channel to be used, and changes the frequency channel used for transmission or reception to the read frequency channel.

(Second Embodiment)

A second embodiment will be described with reference to FIG. 3. A communication system 2 according to the second embodiment includes a third wireless device 300 and the second wireless device 200.

Figure 3:
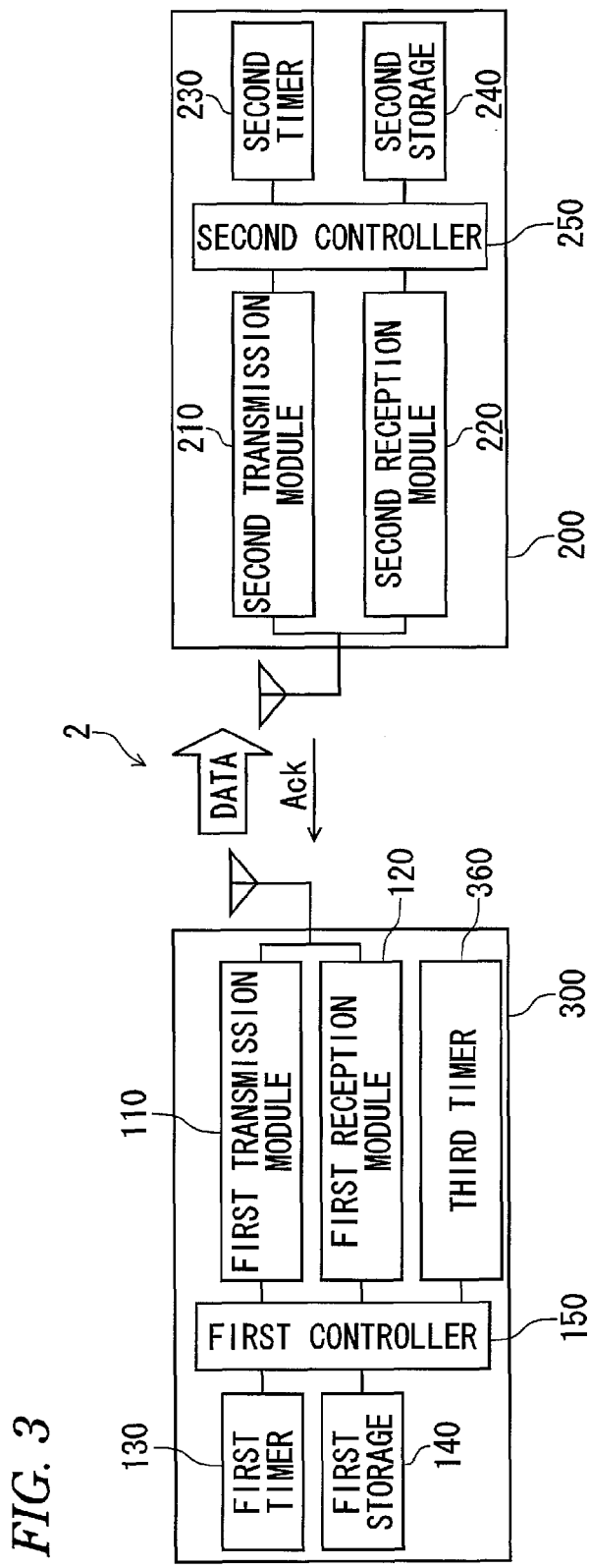
FIG. 3 is an exemplary view illustrating a communication system 2 according to a second embodiment.

In addition to the configuration of the first wireless device 100, the third wireless device 300 illustrated in FIG. 3 includes a third timer 360. The third timer 360 measures a time elapsed from transmission of a transmission packet from the first transmission module 110, and a timeout of the third timer 360 occurs when the measured time exceeds a second period. When the transmission packet is retransmitted, the first controller 150 stops the retransmission upon notification of the timeout from the third timer 360. The third timer 360 serves as a retransmission timer for limiting the number of times the retransmission is performed.

The period of time (first period) continued until the timeout of the first timer 130 occurs is shorter than the period of time (second period) continued until the timeout of the third timer 360 occurs. Thus, the third wireless device 300 can change the frequency channel at least once in retransmitting the transmission packet, and thus can more reliably transmit the transmission packet to the second wireless device 200. In particular, the first period (T1) is obtained by dividing the second period (T2) by a multiple of the number (n) of switchable frequency channels (where n=4 in FIG. 2B), i.e., T1=T2/kn where k denotes a natural number, thus making it possible to make an attempt to retransmit the transmission packet by using all the frequency channels in the second period. It is to be noted that the first period should not be reduced to be equal to or less than twice the single packet exchange period, i.e., the period between the transmission of the transmission packet by the third wireless device 300 and the transmission of the associated Ack packet by the second wireless device 200.

(Third Embodiment)

Figure 4:
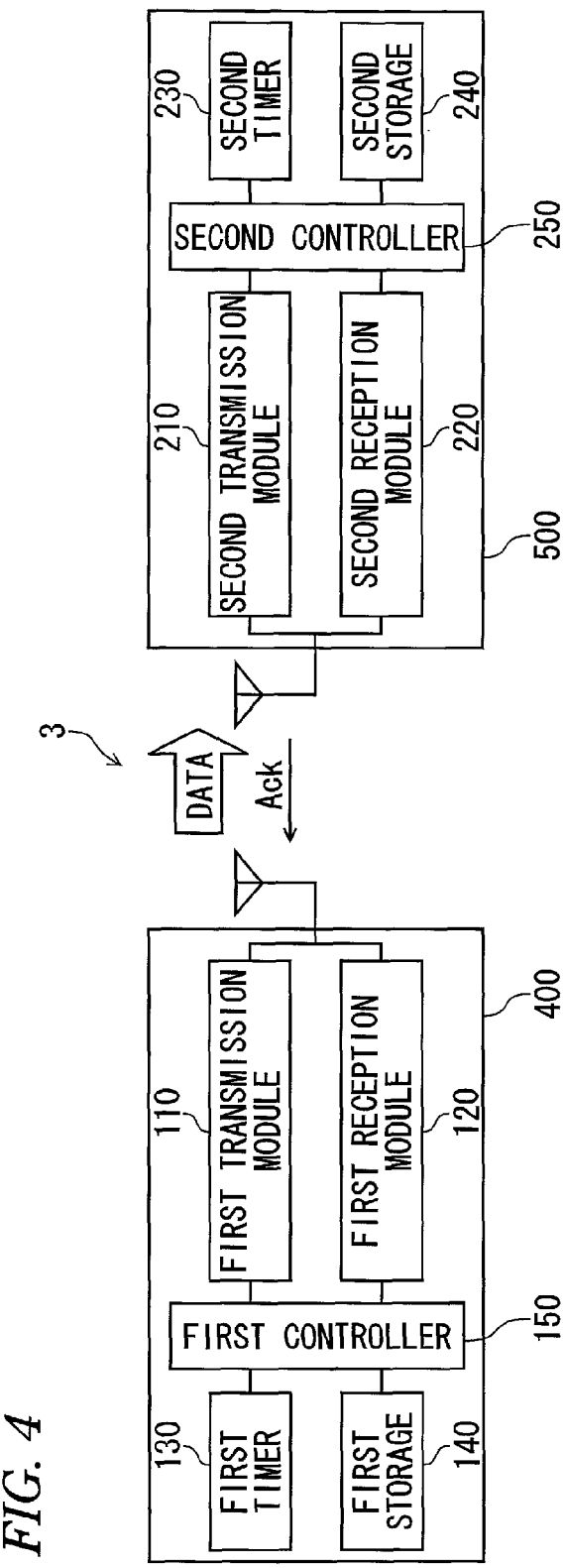
FIG. 4 is an exemplary view illustrating a communication system 3 according to a third embodiment.

FIG. 4 illustrates a third embodiment. A communication system 3 according to the third embodiment includes a fourth wireless device 400 and a fifth wireless device 500.

The fourth wireless device 400 illustrated in FIG. 4 is configured similarly to the first wireless device 100, but is different from the first wireless device 100 in that the first timer 130 is stopped in accordance with frequency of data given from a higher layer. The fifth wireless device 500 is configured similarly to the second wireless device 200, but is different from the second wireless device 200 in that carrier sense is carried out and the second timer 230 is stopped in accordance with a period during which power of a certain value or more is received.

When data is not given from the higher layer for a period of time equal to or longer than a maximum IFS (Inter Frame Space) of the communication system, i.e., a third period, the first controller 150 of the fourth wireless device 400 provides a stop instruction to the first timer 130 so as to stop time measurement. Upon reception of the stop instruction from the first controller 150, the first timer 130 stops time measurement until a restart instruction is provided. When data is inputted from the higher layer after the first controller 150 has provided the stop instruction, the first controller 150 provides the restart instruction to the first timer 130 so as to restart time measurement. The first timer 130 retains the time measured until the reception of the stop instruction, and restarts measurement from the retained time upon reception of the restart instruction.

On the other hand, the second controller 250 of the fifth wireless device 500 receives information on the received power from the second reception module 220. The second controller 250 makes a comparison between a power value indicated by the power information and a threshold value, thus determining whether or not the power value includes power other than noise. When a period, during which it is determined that the power value does not include power other than noise, is continued for a long period of time equal to or longer than the IFS, the second controller 250 provides a stop instruction to the second timer 230 so as to stop time measurement. Upon reception of the stop instruction from the second controller 250, the second timer 230 stops time measurement until a restart instruction is provided. When it is determined that the power value, indicated by the power information received from the second reception module 220, includes power other than noise after the second controller 250 has provided the stop instruction, the second controller 250 provides the restart instruction to the second timer 230 so as to restart time measurement. The second timer 230 retains the time measured until the reception of the stop instruction, and restarts measurement from the retained time upon reception of the restart instruction.

Thus, according to the third embodiment, effects similar to those of the first embodiment are obtainable; in addition, in a case where packets are not continuously transmitted, it is possible to avoid an unnecessary frequency channel switching operation that will be triggered when the first and second timers 130 and 230 are operated without being stopped. Therefore, the power consumed by the fourth and fifth wireless devices 400 and 500 can be suppressed.

Note that in the present embodiment, the case where the first and second timers 130 and 230 in the wireless devices of the first embodiment temporarily stop time measurement has been described, but the first and second timers 130 and 230 in the wireless devices of the second embodiment may also similarly stop time measurement. In that case, in addition to the effects of the second embodiment, effects similar to those of the third embodiment are obtainable.

While certain embodiments have been described, these embodiments have been presented by way of example only, and are not intended to limit the scope of the invention. Indeed, the novel device described herein may be embodied in a variety of other forms; furthermore, various omissions, substitutions and changes in the form of the device, described herein may be made without departing from the spirit of the invention. The accompanying claims and their equivalents are intended to cover such forms or modifications as would fall within the scope and spirit of the invention

What is claimed is:

1. A transmitter comprising:
    a transmission module configured to transmit a signal to a communication partner;
    a reception module configured to receive a positive acknowledgment transmitted by the communication partner when the signal is successfully received by the communication partner;
    a timer configured to measure a time elapsed from reception of the positive acknowledgment by the reception module;
    a storage module configured to store a change order of a plurality of frequency channels to be used for transmission by the transmission module;
    a controller configured to control the transmission module to change the frequency channel based on the change order when another positive acknowledgment is not received before the time measured by the timer exceeds a first period; and
    another timer configured to measure a time elapsed from transmission of the signal by the transmission module;
    wherein the transmission module is configured to retransmit the signal when the positive acknowledgment associated with the signal is not received for a certain period of time;
    wherein when the positive acknowledgment is not received before the time measured by said another timer exceeds a second Period, the controller is configured to control the transmission module to stop retransmission of the signal;
    wherein the first period is longer than the certain period of time and is shorter than the second period;
    wherein the signal that the transmission module is configured to transmit is received from a higher layer; and
    wherein the timer is configured to stop time measurement when a next signal to be transmitted is not received from the higher layer before a third period has elapsed from the transmission of the signal by the transmission module, and the timer is configured to restart the time measurement, from a time at which the time measurement was stopped, when the transmission module receives the next signal to be transmitted from the higher layer.

2. A transmitter comprising:
    a transmission module configured to transmit a signal to a communication partner;
    a reception module configured to receive a positive acknowledgment transmitted by the communication partner when the signal is successfully received by the communication partner;
    a timer configured to measure a time elapsed from reception of the positive acknowledgment by the reception module;
    a storage module configured to store a change order of a plurality of frequency channels to be used for transmission by the transmission module;
    a controller configured to control the transmission module to change the frequency channel based on the change order when another positive acknowledgment is not received before the time measured by the timer exceeds a first period; and
    another timer configured to measure a time elapsed from transmission of the signal by the transmission module;
    wherein the transmission module is configured to retransmit the signal when the positive acknowledgment associated with the signal is not received for a certain period of time;
    wherein when the positive acknowledgment is not received before the time measured by said another timer exceeds a second period, the controller is configured to control the transmission module to stop retransmission of the signal;
    wherein the first period is longer than the certain period of time and is shorter than the second period; and
    wherein the first period (T1) is obtained by dividing the second period (T2) by a multiple of the number (n) of the plurality of frequency channels, such that the first period is obtained from the equation $T1=T2/kn$, where k denotes a natural number.

3. A method for operating a transmitter that includes a storage module which is configured to store a change order of a plurality of frequency channels to be used for transmission, the method comprising:
    transmitting a signal, which is received from a higher layer, to a communication partner;
    receiving a positive acknowledgment transmitted by the communication partner when the signal is successfully received by the communication partner;
    measuring a first time, which elapses from reception of the positive acknowledgment;
    changing the frequency channel used for transmission based on the change order stored by the storage module when another positive acknowledgment is not received before the measured first time exceeds a first period;
    measuring a second time, which elapses from transmission of the signal;
    retransmitting the signal when the positive acknowledgment associated with the signal is not received for a certain period of time, and stopping retransmission of the signal when the positive acknowledgment is not received before the measured second time exceeds a second period; and
    stopping measurement of the first time when a next signal to be transmitted is not received from the higher layer before a third period has elapsed from the transmission of the signal, and restarting measurement of the first time, from a time at which the time measurement was stopped, when the next signal to be transmitted is received from the higher layer;
    wherein the first period is longer than the certain period of time and is shorter than the second period.

* * * * *